United States Patent
Lee et al.

(10) Patent No.: US 11,617,992 B2
(45) Date of Patent: Apr. 4, 2023

(54) HIGH TEMPERATURE STEAM SEPARATION MEMBRANE

(71) Applicant: UCHICAGO ARGONNE, LLC, Chicago, IL (US)

(72) Inventors: Tae H. Lee, Naperville, IL (US); Uthamalingam Balachandran, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 191 days.

(21) Appl. No.: 17/168,646

(22) Filed: Feb. 5, 2021

(65) Prior Publication Data

US 2022/0250010 A1    Aug. 11, 2022

(51) Int. Cl.
*B01D 53/22*    (2006.01)
*B01D 71/02*    (2006.01)
(Continued)

(52) U.S. Cl.
CPC ......... *B01D 71/024* (2013.01); *B01D 53/228* (2013.01); *B01D 63/063* (2013.01);
(Continued)

(58) Field of Classification Search
CPC .. B01D 69/02; B01D 2325/04; B01D 63/063; B01D 71/024; B01D 53/228; B01D 2053/223; B01D 2325/02; B01D 69/12
See application file for complete search history.

(56) References Cited

U.S. PATENT DOCUMENTS

2005/0222479 A1* 10/2005 Balachandran ...... B01J 19/2475
                                                       585/654
2007/0186768 A1    8/2007 Coors
(Continued)

FOREIGN PATENT DOCUMENTS

WO    WO-2013048654 A1 *    4/2013    ............. C04B 35/50

OTHER PUBLICATIONS

S. Robinson, A. Manerbino, G. Coors, N. Sullivan, "Fabrication and Performance of Tubular, Electrode-Supported BaCe0.2Zr0.7Y0.1O3-δ Fuel Cells", Fuel Cells, 13, (2013)(4), 584-591 (Year: 2013).*

Robinson et al. "Galvanic hydrogen pumping in the protonic ceramic perovskite BaCe0:2Zr0:7Y0:1O3-δ" Journal of Membrane Science 446 (2013) 99-105 (Year: 2013).*

(Continued)

*Primary Examiner* — Anthony R Shumate
(74) *Attorney, Agent, or Firm* — Olson & Cepuritis, Ltd.

(57) ABSTRACT

Ceramic proton-conducting oxide membranes are described herein, which are useful for separating steam from organic chemicals under process conditions. The membranes have a layered structure, with a dense film of the perovskite over a porous composite substrate comprising the perovskite material and a metallic material (e.g., Ni, Cu, or Pt). The perovskite comprises an $ABO_3$-type structure, where "A" is Ba and "B" is a specified combination of Ce, Zr, and Y. The perovskite ceramic materials described herein have an empirical formula of $Ba(Ce_xZr_{1-x-n}Y_n)O_{3-\delta}$, wherein $0<x<0.8$ (e.g., $0.1 \le x \le 0.7$ or $0.2 \le x \le 0.5$); and $0.05 \le n \le 0.2$; and $\delta = n/2$. In some embodiments n is about 0.2. In some other embodiments $0.6 \le x \le 0.8$; and n is about 0.2, such as $Ba(Ce_{0.7}Zr_{0.1}Y_{0.2})O_{3-\delta}$, also referred to herein as BCZY712.

19 Claims, 4 Drawing Sheets

(51) Int. Cl.
  *B01D 69/12* (2006.01)
  *B01D 69/02* (2006.01)
  *B01D 63/06* (2006.01)

(52) U.S. Cl.
  CPC ............. *B01D 69/02* (2013.01); *B01D 69/12* (2013.01); *B01D 2053/223* (2013.01); *B01D 2325/02* (2013.01); *B01D 2325/04* (2013.01)

(56) References Cited

U.S. PATENT DOCUMENTS

| | | | | |
|---|---|---|---|---|
| 2010/0112408 | A1* | 5/2010 | Yang | H01M 4/9033 252/519.15 |
| 2011/0195342 | A1* | 8/2011 | Luo | B01D 69/12 429/495 |
| 2013/0143142 | A1* | 6/2013 | Liu | H01M 8/145 429/535 |
| 2015/0099061 | A1* | 4/2015 | Liu | H01M 4/8885 427/78 |
| 2015/0099063 | A1* | 4/2015 | Liu | H01M 4/8814 427/115 |
| 2015/0099209 | A1* | 4/2015 | Liu | H01M 8/1213 429/482 |
| 2015/0099211 | A1* | 4/2015 | Bierschenk | H01M 4/8621 429/482 |
| 2015/0099212 | A1* | 4/2015 | Bierschenk | H01M 4/8867 429/495 |
| 2015/0314232 | A1* | 11/2015 | Chen | C22C 29/12 95/56 |
| 2019/0119110 | A1* | 4/2019 | Chen | B01D 53/228 |
| 2019/0356008 | A1* | 11/2019 | Liu | H01M 8/126 |

OTHER PUBLICATIONS

Robinson et al. "Developmentof Cu-based Anodes for BZCY72 Proton Ceramic Membrane Reactors" <https://www.researchgate.net/publication/266683687> Oct. 10, 2014., 2 pages (Year: 2014).*
Al, S. et al., The Role of Metal Catalyst on Water Permeation and Stability of BaCe0.8Y0.2O3-δ, Journal of Electrochemical Science and Technology 9 (3), 212-219 (2018).
Balachandran, U., High Temperature Membrane For In-Situ Process-Water Removal, U.S. DOE Advanced Manufacturing Office Virtual Program Review, Jun. 2-3, 2020.
Coors, W.G., Protonic Ceramic Steam-Permeable Membranes, Solid State Ionics 178, 481-485 (2007).
Coors, W.G. et al., "Fabrication of Yttrium-Doped Barium Zirconate for High Performance Protonic Ceramic Membranes"; Chapter 3 from Perovskite Materials—Synthesis, Characterisation, Properties, and Applications, Edited by Likun Pan; pp. 83-106 (2016).
Hancke, R. et al., The Kinetics of Hydration and H/D Isotope Exchange of Y-Doped Barium Cerate and Lanthanum Tungstate Studied by Transient Thermogravimetry, Journal of the Electrochemical Society 160 (8), F757-F763 (2013).
Kreuer, K.D., Proton-Conducting Oxides, Annual Reviews Material Res. 33, 333-359 (2003).
Ricote, S. et al., Water Vapour Solubility and Conductivity Study of the Proton Conductor BaCe(0.9-x)ZrxY0.1O(3-δ), Solid State Ionics 180, 990-997 (2009).
Sanders, M. et al., Development of a Multi-Species Transport Space Theory and Its Application Permeation Behavior in Proton-Conducting Doped Perovskites, Journal of Materials Chemistry 20, 6271-6281 (2010).
Shi, H. et al., Electrolyte Materials For Intermediate-Temperature Solid Oxide Fuel Cells, Progress in Natural Science Materials International 30, 764-774 (2020).

* cited by examiner

HIGH TEMPERATURE STEAM SEPARATION MEMBRANE

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to high temperature steam separation membranes and method of separating steam from chemical process streams therewith.

BACKGROUND OF THE INVENTION

Water is a main by-product of many chemical processes, such as the production of hydrocarbons from synthesis gas, condensation reactions, and oxidative dehydrogenation. Water can also be used as a necessary non-reacting co-feed that does not directly participate in the synthesis reaction, e.g., to reduce coking in dehydrogenation processes or as an energy carrier in endothermic processes. Water often is undesirable as a primary byproduct at a reaction site because it can lower the reaction rate and hinder equilibrium conversion to the desired products. Due to its strong competitive adsorption on catalysts, a high water concentration at the reaction site can also deactivate catalysts or shorten the interval between catalyst regenerations. In most cases, water must be removed before or during product purification.

Current water removal technologies include direct condensation, complex techniques like azeotropic distillation, and vacuum or reactive distillation. Large energy losses associated with water removal could be avoided, and process efficiency significantly improved, by using in-situ water removal membranes to circumvent the energy-intensive conventional approaches for separating water at low temperatures and pressures. Water removal membranes provide a continuous flux of steam at constant temperature and pressure, while avoiding energy-consuming steps of conventional separation methods.

Existing polymer-based membrane technologies have limited temperature performances, because most gas—solid catalytic process occur at temperatures ranging from 200 to 900° C.; below 200° C. the reaction rate would generally be too low. Such polymeric membrane technologies are generally applicable for low-temperature separations and are not designed for high-temperature process conversions. Inorganic membranes are much more thermally robust; however, inorganic membranes are far less developed and less commercialized than their organic counterparts. More development effort is needed to take advantage of the resistance of ceramic membranes to chemicals, mechanical stability at high pressures, and high throughput fluxes. Removing water under process conditions with a high-temperature membrane avoids the inefficiency of condensing and reheating water for steam. Application of a high-temperature water-removal membrane during production of ethylene, styrene, and methanol would result in approximately 55% reduction in steam energy usage and approximately 65% reduction in boiler equipment cost.

There is an ongoing need for new water removal membranes that can operate and remain stable under chemical processing conditions at high temperatures. The membranes and methods described herein address this need.

SUMMARY OF THE INVENTION

Ceramic proton-conducting oxide membranes are described herein, which are useful for separating steam from organic chemicals under process conditions. The membranes comprise ceramic materials with an $ABO_3$-type perovskite structure, i.e., a perovskite $ABO_3$ material where "A" is Ba and "B" is a specified combination of Ce, Zr, and Y. Y substitution in the B site in $ABO_3$-type perovskite generates oxygen vacancies, which are important for oxygen ion and proton conductivity in the compound. The perovskite ceramic materials described herein have an empirical formula of $Ba(Ce_xZr_{1-x-n}Y_n)O_{3-\delta}$, wherein $0<x<0.8$ (e.g., $0.1 \leq x \leq 0.7$ or $0.2 \leq x \leq 0.5$); $0.05 \leq n \leq 0.2$; and $\delta=n/2$. In some embodiments n is about 0.2. In some other embodiments $0.6 \leq x \leq 0.8$; and n is about 0.2, such as $Ba(Ce_{0.7}Zr_{0.1}Y_{0.2})O_{3-\delta}$, also referred to herein as BCZY712. The membranes have a layered structure, with a dense film of the perovskite over a porous composite substrate comprising the perovskite material and a metallic material (e.g., Ni, Cu, or Pt).

The following non-limiting embodiments are set forth below to highlight certain features and aspects of the membranes described herein.

Embodiment 1 is a porous membrane useful for steam separation, the membrane comprising: (a) a shaped, porous substrate comprising a composite of a metal and a perovskite ceramic material of formula $Ba(Ce_xZr_{1-x-n}Y_n)O_{3-\delta}$, wherein $0<x<0.8$; $0.05 \leq n \leq 0.2$; and $\delta=n/2$; and (b) a dense film of the perovskite ceramic material of formula $Ba(Ce_xZr_{1-x-n}Y_n)O_{3-\delta}$ contacting and covering a surface of the shaped, porous substrate.

Embodiment 2 comprises the membrane of embodiment 1, wherein $0.1 \leq x \leq 0.7$.

Embodiment 3 comprises the membrane of embodiment 1 or 2, wherein $0.2 \leq x \leq 0.5$.

Embodiment 4 comprises the membrane of any one of embodiments 1 to 3, wherein n is about 0.2.

Embodiment 5 comprises the membrane of any one of embodiments 1 to 4, wherein the metal is elected from the group consisting of Ni, Cu, and Pt.

Embodiment 6 comprises the membrane of any one of embodiments 1 to 5, wherein the porous substrate has a porosity in the range of about 10 to about 40 volume percent.

Embodiment 7 comprises the membrane of any one of embodiments 1 to 6, wherein the porous substrate has a porosity of about 30 volume percent.

Embodiment 8 comprises the membrane of any one of embodiments 1 to 7, wherein the porous substrate has a thickness in the range of about 0.5 to about 2 mm.

Embodiment 9 comprises the membrane of any one of embodiments 1 to 8, wherein the dense film has a thickness in the range of about 5 to about 30 μm.

Embodiment 10 comprises the membrane of any one of embodiments 1 to 9, wherein the porous substrate comprises about 25 to about 100 percent by weight (wt %) of the perovskite and about 0 to about 75 wt % of the metal.

Embodiment 11 comprises the membrane of any one of embodiments 1 to 10, wherein the porous support comprises about 40 wt % of the perovskite and about 60 wt % of the metal.

Embodiment 12 comprises the membrane of any one of embodiments 1 to 11, wherein the membrane is in the shape of a tube and the dense film is on the interior of the tube.

Embodiment 13 comprises a porous membrane useful for steam separation, the membrane comprising: (a) a shaped, porous substrate comprising a composite of Ni and a perovskite ceramic material of formula $Ba(Ce_xZr_{1-x-n}Y_n)O_{3-\delta}$, wherein $0.6 \le x \le 0.8$; n is about 0.2; and $\delta=n/2$; and (b) a dense film of the perovskite ceramic material of formula $Ba(Ce_xZr_{1-x-n}Y_n)O_{3-\delta}$ contacting and covering a surface of the shaped, porous substrate;

wherein the porous substrate has a thickness in the range of about 0.5 to about 2 mm; the dense film has a thickness in the range of about 5 to about 30 μm; the porous substrate has a porosity in the range of about 10 to about 40 volume percent, and the porous substrate comprises about 25 to about 100 percent by weight (wt %) of the perovskite and about 0 to about 75 wt % of a metal selected from the group consisting of Ni, Cu, and Pt.

Embodiment 14 comprises the membrane of embodiment 13, wherein x is about 0.7, the porous substrate has a porosity of about 25 to about 35 volume percent, and the porous substrate comprises about 35 to about 45 wt % of the perovskite and about 55 to 65 wt % of the metal.

Embodiment 15 comprises the membrane of embodiment 13 or 14, wherein the metal is Ni.

Embodiment 16 comprises the membrane of any one of embodiments 13 to 15, wherein the membrane is in the shape of a tube and the dense film is in the interior of the tube.

In the approach described herein, reclaimed process water is in the form of steam, whose latent heat is available for reuse as an energy source. With potential to impact a wide array of energy-intensive industrial processes with steam as a byproduct, the membranes described herein advance the engineering and development of transformational manufacturing technologies that could significantly improve the competitiveness of U.S. industry.

The methods and materials described herein comprise certain novel features hereinafter fully described, which are illustrated in the accompanying drawings and the following description, and which are particularly pointed out in the appended claims. It is to be understood that various changes in the details may be made without departing from the spirit, or sacrificing any of the advantages of the systems, electrochemical reactors, and methods described herein.

DETAILED DESCRIPTION OF THE PRESENT INVENTION

Figure 1:
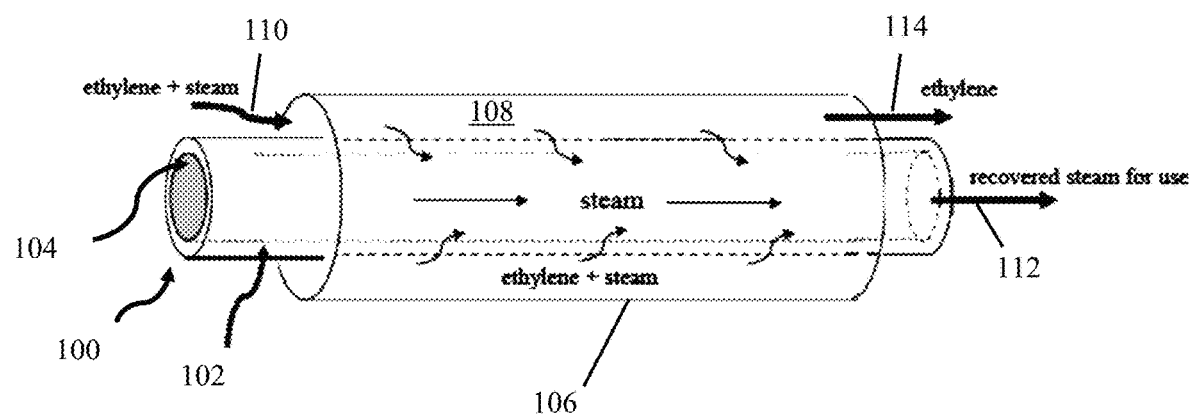
FIG. 1 provides a schematic illustration of a tubular membrane as described herein.

Perovskite-type ceramic materials of formula $Ba(Ce_xZr_{1-x-n}Y_n)O_{3-\delta}$ are described herein wherein $0<x<0.8$; $0.05 \le n \le 0.2$; and $\delta=n/2$. These materials are useful for preparing layered, composite ceramic membranes that are thermally stable at relatively high temperatures of about 600 to about 900° C., and capable of separating steam from chemical process streams and materials at such temperatures. In some embodiments, x ranges from about 0.1 to about 0.7. In other embodiments, x ranges from about 0.2 to about 0.5. In some particular embodiments, x ranges from 0.6 to less than about 0.8 (e.g., x is about 0.7), and n is about 0.2.

The perovskite material of formula $Ba(Ce_xZr_{1-x-n}Y_n)O_{3-\delta}$ is prepared by solid-state reaction method. $BaCe_{1-n}Y_nO_{3-\delta}$ and $BaZr_{1-n}Y_nO_{3-\delta}$ are combined in a ball mill in a stoichiometric ratio sufficient to achieve the desired proportion of Ce and Zr in the final product. The BCY/BZY mixture is then ball-milled for about 24 hours in an alcohol such as isopropyl alcohol (IPA) with zirconia milling media. The ball-milled powder is dried (after removing the zirconia media) and then calcined at about 1000° C. for about 10 hours in air. The ball milling and calcining steps are repeated to prepare single-phase compound. Single-phase formation is confirmed by X-ray diffraction measurement of the powder.

In some embodiments, the porous support is made by grinding a mixture of the perovskite with a metal oxide, e.g., NiO, a pore former such as a carbon material such as, e.g., lampblack, and the like, and an organic binder such as poly(vinyl acetate) (PVA), poly(2-ethyl-2-oxazoline, and the like. The ground mixture is then formed into a desired shape and sintered at a temperature in the range of about 800 to about 850° C. in air for about 5 to about 20 hours (e.g., about 15 hours). Under these conditions, the carbon and binder burn away, leaving behind a porous composite of the perovskite and metal oxide, referred to herein as a precursor substrate. A precursor membrane is created by coating a surface of the porous precursor substrate with a slurry or colloidal suspension of the perovskite, followed by sintering at a temperature in the range of about 1300 to about 1450° C. (e.g., about 1350° C.). The porous precursor substrate is then heated in a reducing atmosphere (e.g., a mixture of hydrogen in an inert gas such as nitrogen, argon, or helium) at a temperature in the range of about 600 to about 900° C. to convert the metal oxide to a metal, which also increases the porosity of the substrate.

Typically, the mixture of perovskite, metal oxide, carbon and binder will comprise about 30 to about 40 wt % of the perovskite, about 40 to about 55 wt % metal oxide, about 10 to about 20 wt % of the pore former, and about 0.5 to about 1.5 wt % of the binder.

Nickel is a preferred metal, as it can act as a catalyst for incorporation of water into the membrane. Other metals include copper and platinum. In the case of copper, the low melting temperature of copper oxides would preclude including the copper oxide in the mixture of perovskite, carbon and binder. Instead, a copper oxide can be infiltrated into a porous perovskite after sintering, and then reduced to copper metal, e.g., by heating in a hydrogen atmosphere.

The precursor membrane can be made in any shape or form prior to sintering, and the final membrane will generally retain that shape after sintering, albeit with some dimensional shrinkage. In some embodiments, the membrane is prepared in a tubular shape, with the dense film on the interior of the tube. FIG. 1 provides a schematic illustration of such a tubular membrane illustrated in use in a process for removing steam from a chemical process stream such as an ethylene process stream. In FIG. 1, tubular membrane 100 has a porous outer substrate 102 comprising the perovskite and a metal (e.g., Ni) and an inner surface 104 comprising a dense film of the perovskite. Membrane 100 is surrounded by a tubular housing leaving space 108 for a feed stream 110 comprising ethylene and steam to flow over substrate 102. As the feed stream 110 flows, steam is transported across the membrane into the interior of the membrane, which is swept with an inert gas stream 112 to carry away the steam for use in another process. Steam-depleted ethylene stream 114 is recovered for further use.

Figure 2:
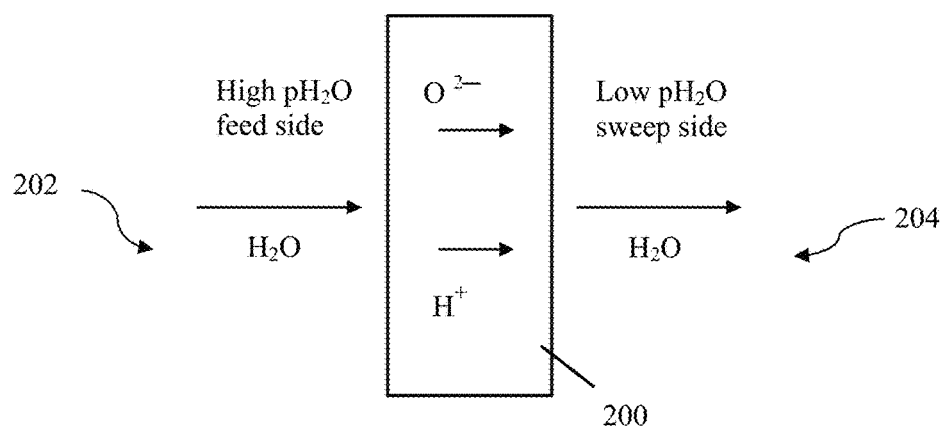
FIG. 2 provides a schematic illustration of a mechanism for water vapor (steam) transport through the membrane.

FIG. 2 schematically illustrates a mechanism for water transport across the membrane. In FIG. 2, perovskite membrane 200 is exposed to a feed stream 202 of relatively high partial pressure of water vapor (steam) on one side and a gas stream 204 of relatively low partial pressure water vapor (steam) on the other side. Steam dissociates into oxygen and hydrogen on the high $pH_2O$ side 202, and oxide ions fill oxygen voids in the perovskite, which results in a net migration of oxygen voids toward the high $pH_2O$ side 202, and a net migration of oxide ion ($O^{2-}$) and protons ($H^+$) toward the low $pH_2O$ side 204. Oxide ions and protons recombine as water again at the surface of the low $pH_2O$ side 204. Thus, no single water molecule actually migrates through the membrane, but rather, there is a net migration of ions, which then reform water at the other side of the membrane. The membranes described herein are useful in a variety of applications for removing process steam from other gaseous chemical products, such as ethylene (from ethane/propane cracking) and styrene (from ethylbenzene) production processes. Ethylene production temperature typically is around 830 to 900° C. and the styrene production temperature typically is around 600 to 650° C. Effluents comprising steam are passed over one side of the membrane (feed side) and the steam is removed to the other (permeate side) side of the membrane. The retentate on the feed side of the membrane is the steam-depleted product (e.g., ethylene or styrene.) It is to be understood that cracking effluents have other impurities (hydrocarbons) in addition to main products (e.g., ethylene or styrene). Therefore, the retentate will still include those hydrocarbon impurities, which will be removed via other product purification steps routine in the chemical processing art. Of course, the membranes can be used for removing steam from any other organic process stream, as well.

The following non-limiting examples are provided to illustrate certain aspects and features of the materials and methods described herein.

Example 1. Synthesis of BCZY712

To prepare BCZY712 ($BaCe_{0.7}Zr_{0.1}Y_{0.2}O_{3-\delta}$), stoichiometric amounts of $BaCe_{0.8}Y_{0.2}O_{3-\delta}$ (44.44 g) and $BaZr_{0.8}Y_{0.2}O_{3-\delta}$ (5.56 g) powder were mixed by ball milling for 24 hours in isopropyl alcohol (IPA, 100 ml) with zirconia milling media (40 balls of about 1 cm diameter). The ball-milled powder was dried (after removing the zirconia balls) and then calcined at about 1000° C. for about 10 hours in air. The ball-milling and calcining steps can be repeated until a single-phase compound forms, as confirmed by x-ray analysis.

Example 2. Fabrication of the BCZY712 ($BaCe_{0.7}Zr_{0.1}Y_{0.2}O_{3-\delta}$) Dense Film on Porous Ni-BCZY712 Substrate (a) Precursor substrate preparation: Selected amounts of BCZY712 powder, NiO powder, pore former (carbon lampblack powder), and poly(vinyl acetate) binder (PVA) are mixed by ball milling in isopropyl alcohol (IPA) with zirconia milling media. The ball-milled/mixed powder is dried (after removing the zirconia balls), and the dried cake is crushed (in a mortar and-pestle) and sieved. A disk of about 1 inch diameter (about 2.5 cm diameter) and about 2 mm thickness is pressed using the mixed/sieved powder in a uniaxial press at about 200 MegaPascals (MPa). The pressed substrate disk is partially sintered at about 800 to about 850° C. for about 15 h in air to form a precursor substrate comprising the BCZY712 and NiO.

(b) Film Fabrication: BCZY712 powder is dispersed in isopropyl alcohol and a colloidal solution is prepared. A partially-sintered precursor substrate disk is dipped into the colloidal solution (colloidal dip-coating process) four to five times (the dipped disk is dried on a hot-plate after each dipping). The dipping and drying steps are repeated to coat the substrate with the BCZY712 film. The number of dipping and drying steps determines the ultimate film thickness.

The precursor substrate coated with the BCZY712 by the above dipping/drying process is sintered at about 1350° C. for about 4 h in air. Upon this high-temperature sintering, the disk (with the coated film) shrinks to diameter of about 0.75 inch. Since the precursor substrate disk is dipped in the colloidal solution and subsequently sintered at high-temperature, the entire substrate is coated with dense BCZY film. In such case, one dense film side is polished off, to form a precursor membrane. Alternatively, one side of the substrate can be masked or otherwise protected, e.g., with a coating or film that will repel the perovskite coating solution, but will be removable before sintering or will burn off during sintering, so that only the unprotected side is coated with the dense film. Optionally, another coating method, such as a drawn film method, can be used to coat just one side of the precursor substrate.

Next, the nickel oxide in the substrate is reduced to metallic nickel (e.g., heating at about 600 to about 900° C. in a reducing atmosphere, e.g., a mixture of hydrogen and an inert gas such as nitrogen or argon) to form the final membrane structure.

For the steam permeation testing described herein, the sintered film was polished off from one side of the sintered disk to expose the porous precursor substrate and then subjected to steam permeation measurement under a reducing atmosphere so that the NiO is converted to Ni in situ during the test procedure. A membrane with total (dense film and porous substrate) disk thickness of about 1 mm was used to measure the steam permeation rate.

Figure 3:
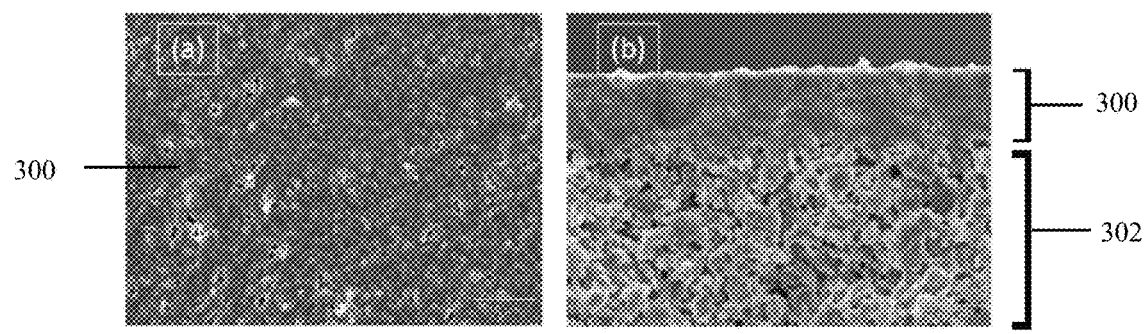
FIG. 3 provides SEM micrographs of the surface of a precursor membrane comprising a perovskite dense film over a porous perovskite/metal oxide substrate. Panel (a) shows a top view of the dense film; and Panel (b) provides a cross-section showing the dense film 300 and the porous precursor substrate 302. The micron marker in the bottom right of the micrograph is 10 micron.

(c) Following the processes described in (a) and (b) of this example, a partially sintered porous precursor substrate was fabricated from a mixture of BCZY712 (40 g), NiO (60 g), PVA (1 g) and carbon lampblack powder (14 g), milled with 80 balls of about 1 cm diameter zirconia milling media in 100 mL of IPA. After pressing and sintering, the substrate was coated with BCZY712 by dipping the substrate disk four times in a suspension of 3 g of BCZY712 in 100 mL IPA, drying on a hotplate between each coating dip. The resulting coated disk was then sintered at about 1350° C. for about 4 h in air to form a precursor membrane comprising a dense film of BCZY712 on a porous NiO/BCZY712 substrate. The dense film from one side of the substrate was then polished off to expose the porous precursor substrate to form a precursor membrane in which the porous substrate is only coated on one side. FIG. 3 shows SEM micrographs of the surface of the dense film 300 (panel (a)) of BCZY712 and a fracture surface showing the dense film 300 on the porous NiO/BCZY712 precursor substrate 302 (panel (b)). The micron marker in the bottom right of the micrograph is 10 micron.

Example 3. Steam Flux Measurement and Conversion of NiO to Ni

Figure 4:
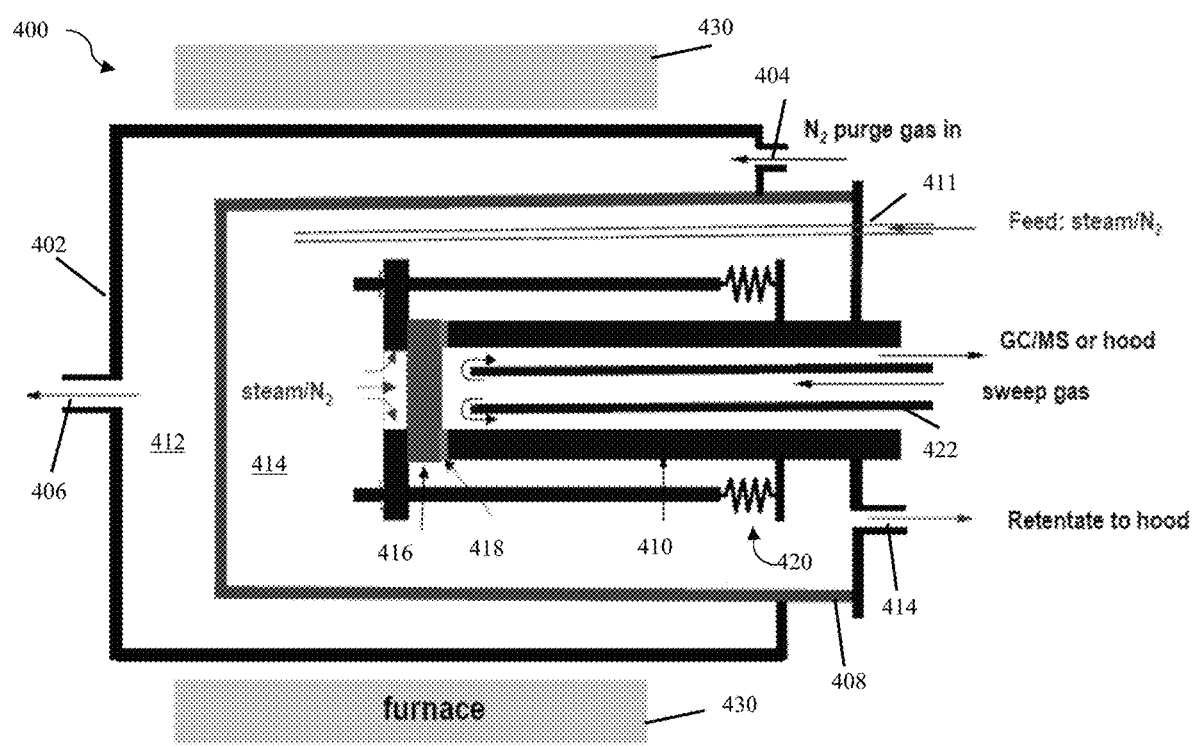
FIG. 4 provides a schematic illustration of an apparatus for steam permeation measurements on the membranes described herein.

The steam flux through a membrane sample is measured by affixing the sample to an $Al_2O_3$ tube with a gold O-ring in the assembly shown in cross-section FIG. 4. The apparatus 400 in FIG. 4 comprises an outer cylindrical housing 402 with a gas inlet 404 for a nitrogen purge gas, and an outlet 406. Cylindrical alumina vessel 408 is nested within housing 402 creating a chamber 412 surrounding vessel 408. Vessel 408 includes an inlet tube 411 for introducing a flowing nitrogen/steam gas mixture an outlet 414 for the nitrogen/steam flow. Alumina tube 410 is nested within vessel 408 with one end inside the vessel and one end out. The space around tube 410 within vessel 408 defines a chamber 414 for the flowing nitrogen/steam mixture. The end of tube 410 within vessel 408 is caped with composite membrane 416 comprising the perovskite dense layer on the porous metal/perovskite substrate. The membrane 416 is oriented with the dense film side facing the tube 410. A gold O-ring 418 is interposed between the tube and the dense film of membrane 416, and membrane 416 is held in place by spring-claim assembly 420. Tube 422 is positioned within the open end of tube 410 to introduce a stream of helium sweep gas to carry away steam from membrane 416 during use. Housing 402 is surrounded by furnace 430, which is capable of heating the entire apparatus to temperatures up to at least 950° C.

As described above, the gold O-ring was used on the dense film side of the membrane architecture. A gas-tight seal formed when the assembly was heated to about 950° C. and spring-loaded rods squeezed the gold O-ring between the disc and the tube 410. During sealing, wet (3 vol % $H_2O$) 3.5% $H_2$ in $N_2$ was flowed over the substrate (feed) side of the sample, while dry, ultrahigh-purity (UHP) helium was flowed over the film (sweep) side. The exposure to $H_2$ at the temperature range of the steam flux measurement converts NiO to Ni in the porous substrate, which creates some additional porosity. Once the gas-tight seal was formed, the temperature of the furnace was lowered to the steam permeation measurement temperatures (about 600 to 900° C.). The gas-tightness of the seal was monitored by checking for nitrogen leak to the helium side during experiments.

For the steam permeation measurement, 3.5% $H_2$/balance $N_2$ was used as a feed gas. About 200 mL/min of the feed gas was passed through a water bubbler or was mixed with the steam generated by heating liquid water supplied from liquid pump. UHP He was used as a sweep gas (typical flowrate of the sweep gas was about 400 mL/min). The partial pressure of steam ($pH_2O$) in the feed side was controlled by the temperature of the water bubbler or the amount of liquid water evaporated when the liquid pump was used in the experiment. All gases were at ambient pressure. Gas flow rates were controlled with MKS mass flow controllers. An AGILENT TECHNOLOGY 3000 Series micro-GC (gas chromatograph) was used to measure the concentration of steam in the sweep gas. The sweep gas flow rate was adjusted to avoid condensation of the steam (into liquid water) during measurement. The steam permeation flux is calculated from the measured concentration of steam in the sweep gas, sweep gas flow rate, and the area of the membrane.

Figure 5:
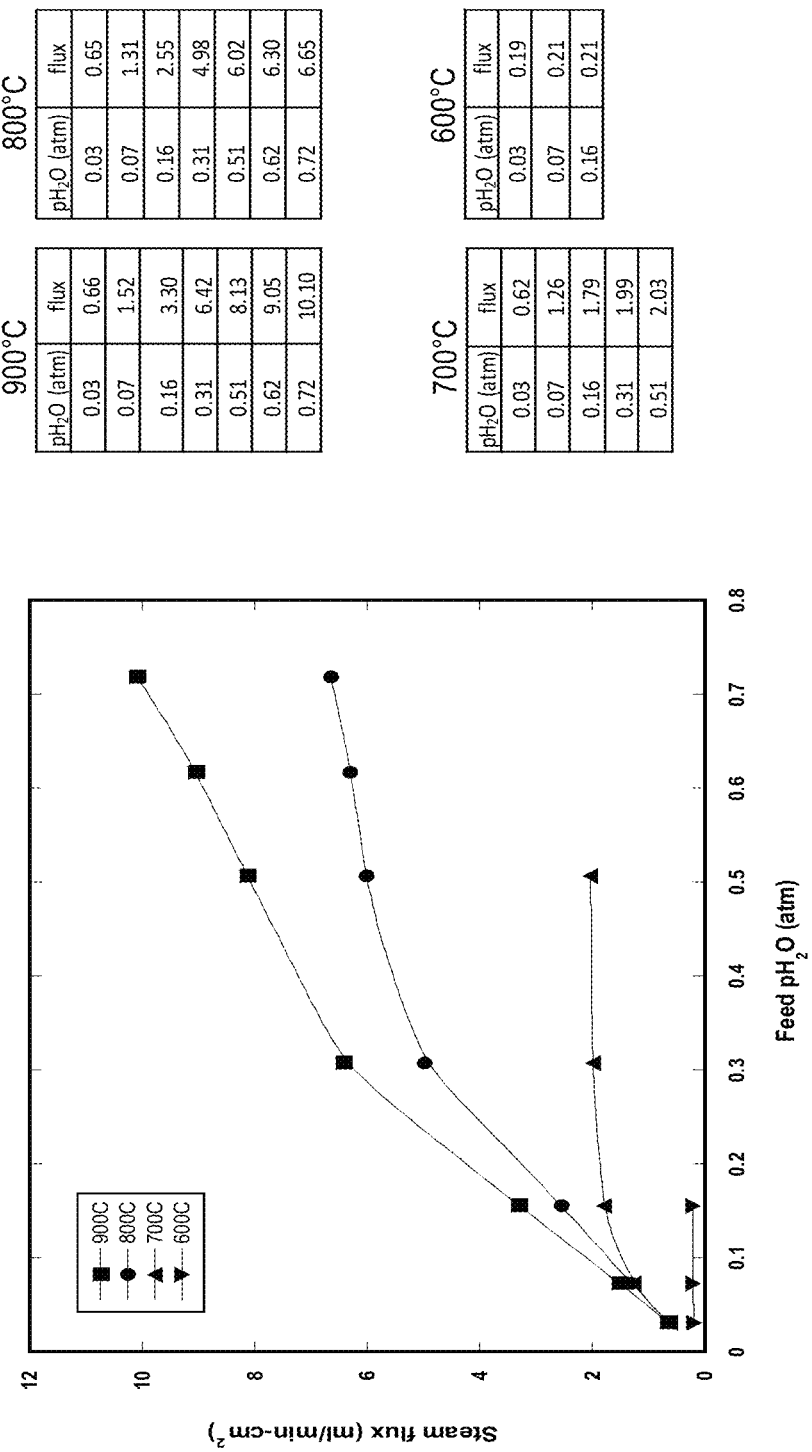
FIG. 5 provides plots of steam flux versus partial pressure of water vapor in the feed at temperatures ranging from 600 to 900° C.
Figure 6:
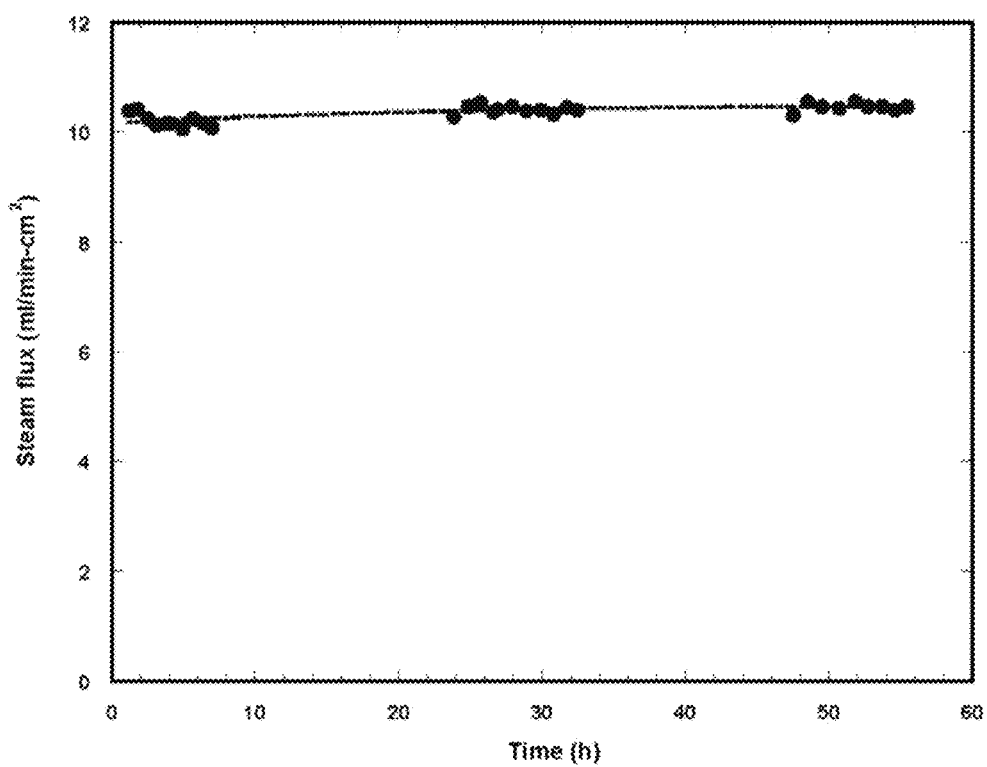
FIG. 6 provides results of a membrane stability test, showing a plot of steam flux versus partial pressure of water vapor in the feed at 900° C. for a period of time in excess of 50 hours.

The precursor membrane described in Example 2(c) was treated with the steam/$H_2$/$N_2$ mixture as described above. FIG. 5 provides plots of steam flux versus partial pressure of water vapor ($pH_2O$) in the feed at temperatures ranging from 600 to 900° C. As the results in FIG. 5 show, steam flux increases with increasing temperature and $pH_2O$, tending toward a steady state flux at higher $pH_2O$ values. To check for long-term stability of the membrane performance, steam permeation flux of a thin-film membrane was measured on a porous Ni-BCZY712 substrate for >50 h at about 900° C. The measured result is provided in FIG. 6 shows remarkable long-term stability over the 50-hour test period, with steam flux remaining essentially constant over the entire duration of the test.

Results/Significance of the Results:

Steam (water vapor) permeation in perovskites involve adsorption of steam to the membrane surface, steam dissociation, bulk diffusion of oxygen vacancies and protonic defects, recombination (incorporation of hydroxide groups), and desorption of steam. Dopants in perovskites strongly affect the oxygen vacancy and protonic defect concentrations and their conduction. Many researchers have studied the proton and oxygen ion conduction in perovskite ceramics by means of ac impedance measurements (not direct water permeation measurements). See, e.g., K. D. Kreuer, *Annu. Rev. Mater. Res.*, 2003, 33(1), 333-359; W. G. Coors, *Solid State Ionics*, 2007, 178(7-10), 481-485. S. Ricote, N. Bonanos and G. Caboche, *Solid State Ionics*, 2009, 180(14-16), 990-997; M. Sanders and R. O'Hayre, *J. Mater. Chem.*, 2010, 20(30), 6271-6281; R. Hancke, Z. Li and R. Haugsrud, *J. Electrochem. Soc.*, 2013, 160(8), F757-F763. A. Al and G. Zhang (*J. Electrochem. Sci. Technol.*, 2018, 9(3), 212-219) reported a maximum steam permeation rate of about 0.03 mL/min-cm² at 800° C. in a $BaCe_{0.8}Y_{0.2}O_{3-\delta}$ (BCY20) membrane. Recently, Balachandran reported a steam permeation rate of 5.8 mL/min-cm² in a thin-film BCY20 membrane (U. (Balu) Balachandran, U.S. DOE Advanced Manufacturing Office Virtual Program Review, Jun. 2-3, 2020). The materials described herein have achieved the highest steam flux of about 10 mL/min-cm² for BCZY712 on Ni-BCZY712 porous substrate.

Significance of High Steam Permeation Flux:

Increasing the steam permeation flux decreases the footprint area of the membrane and the amount of membrane material needed in practical applications. This will also improve the process economy. For example, in an ethylene production plant (plant capacity of 500 million ton/year), one would need about 8000 m² of steam removal membrane with a steam permeation flux of about 5 mL/min-cm² to process 10% of ethylene cracking reactor effluent and recover 44% of heating stream in the effluent at the operating temperature of 830° C. Now, doubling the steam permeation flux (from 5 to about 10 mL/min-cm²) will decrease the required membrane footprint area by 50% (i.e., from about 8000 m² to about 4000 m²). Halving the footprint area of the membrane will reduce membrane module cost by half. The steam permeation (i.e., amount of steam removed) will double, thereby increasing overall process efficiency.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing materials or methods (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the materials or methods described herein and does not pose a limitation on the scope of the claims unless otherwise stated. No language in the specification should be construed as indicating any non-claimed element as essential to the practice of the claims.

Preferred embodiments are described herein, including the best mode known to the inventors for carrying out the claimed invention. Variations of those preferred embodiments may become apparent to those of ordinary skill in the art upon reading the foregoing description. The inventors expect skilled artisans to employ such variations as appropriate, and the inventors intend for the claimed invention to be practiced otherwise than as specifically described herein. Accordingly, the claimed invention includes all modifications and equivalents of the subject matter recited in the claims appended hereto as permitted by applicable law. Moreover, any combination of the above-described elements in all possible variations thereof is encompassed by the claimed invention unless otherwise indicated herein or otherwise clearly contradicted by context.

The embodiments of the invention in which an exclusive property or privilege is claimed are defined as follows:

1. A porous membrane useful for steam separation, the membrane comprising:
   (a) a shaped, porous substrate comprising a composite of a metal and a perovskite ceramic material of formula $Ba(Ce_xZr_{1-x-n}Y_n)O_{3-\delta}$, wherein $0<x<0.8$; n is 0.2; and $\delta=n/2$; and
   (b) a dense film of the perovskite ceramic material of formula $Ba(Ce_xZr_{1-x-n}Y_n)O_{3-\delta}$ contacting and covering a surface of the shaped, porous substrate.

2. The membrane of claim 1, wherein $0.1 \leq x \leq 0.7$.
3. The membrane of claim 1, wherein $0.2 \leq x \leq 0.5$.
4. The membrane of claim 1, wherein $0.1 \leq x \leq 0.7$.
5. The membrane of claim 1, wherein $0.2 \leq x \leq 0.5$.
6. The membrane of claim 1, wherein the metal is selected from the group consisting of Ni, Cu, and Pt.
7. The membrane of claim 1, wherein the porous substrate has a porosity of about 10 to about 40 volume percent.
8. The membrane of claim 1, wherein the porous substrate has a porosity of about 30 volume percent.
9. The membrane of claim 1, wherein the porous substrate has a thickness of about 0.5 to about 2 mm.
10. The membrane of claim 1, wherein the dense film has a thickness of about 5 to about 30 μm.
11. The membrane of claim 1, wherein the porous substrate has a thickness of about 0.5 to about 2 mm; and the dense film has a thickness of about 5 to about 30 μm.
12. The membrane of claim 1, wherein the porous substrate comprises about 25 to about 100 percent by weight (wt %) of the perovskite and about 0 to about 75 wt % of the metal.
13. The membrane of claim 1, wherein the porous substrate comprises about 40 wt % of the perovskite and about 60 wt % of the metal.
14. The membrane of claim 1, wherein the membrane is in the shape of a tube and the dense film is on the interior of the tube.
15. A porous membrane useful for steam separation, the membrane comprising:
   (a) a shaped, porous substrate comprising a composite of Ni and a perovskite ceramic material of formula $Ba(Ce_xZr_{1-x-n}Y_n)O_{3-\delta}$, wherein $0.6 \leq x \leq 0.8$; n is 0.2; and $\delta=n/2$; and
   (b) a dense film of the perovskite ceramic material of formula $Ba(Ce_xZr_{1-x-n}Y_n)O_{3-\delta}$ contacting and covering a surface of the shaped, porous substrate;
   wherein the porous substrate has a thickness of about 0.5 to about 2 mm; the dense film has a thickness of about 5 to about 30 μm; the porous substrate has a porosity of about 10 to about 40 volume percent, and the porous substrate comprises about 25 to about 100 percent by weight (wt %) of the perovskite and about 0 to about 75 wt % of a metal selected from the group consisting of Ni, Cu, and Pt.

16. A porous membrane useful for steam separation, the membrane comprising:
   (a) a shaped, porous substrate comprising a composite of Ni and a perovskite ceramic material of formula $Ba(Ce_xZr_{1-x-n}Y_n)O_{3-\delta}$, wherein x is about 0.7; n is about 0.2; and $\delta=n/2$; and
   (b) a dense film of the perovskite ceramic material of formula $Ba(Ce_xZr_{1-x-n}Y_n)O_{3-\delta}$ contacting and covering a surface of the shaped, porous substrate;
   wherein the porous substrate has a thickness of about 0.5 to about 2 mm; the dense film has a thickness of about 5 to about 30 μm; the porous substrate has a porosity of about 25 to about 35 volume percent; and the porous substrate comprises about 35 to about 45 wt % of the perovskite and about 55 to 65 wt % of a metal selected from the group consisting of Ni, Cu, and Pt.

17. The membrane of claim 16, wherein the metal is Ni.
18. The membrane of claim 15, wherein the metal is Ni.
19. The membrane of claim 15, wherein the membrane is in the shape of a tube and the dense film is in the interior of the tube.

* * * * *

UNITED STATES PATENT AND TRADEMARK OFFICE
CERTIFICATE OF CORRECTION

PATENT NO. : 11,617,992 B2
APPLICATION NO. : 17/168646
DATED : April 4, 2023
INVENTOR(S) : Tae H. Lee and Uthamalingam Balachandran It is certified that error appears in the above-identified patent and that said Letters Patent is hereby corrected as shown below:

In the Claims

Claim 1, Column 9, Line 61, delete "$Ba(Ce_xZr_{1-x-n}Y_n)O_3.\delta$" and insert --$Ba(Ce_xZr_{1-x-n}Y_n)O_{3-\delta}$--.

Signed and Sealed this
Sixth Day of June, 2023

*Katherine Kelly Vidal*

Katherine Kelly Vidal
*Director of the United States Patent and Trademark Office*